M. L. CRANDALL.
WATER FILTERER OR STRAINER.
APPLICATION FILED DEC. 26, 1912.
1,090,283.
Patented Mar. 17, 1914.
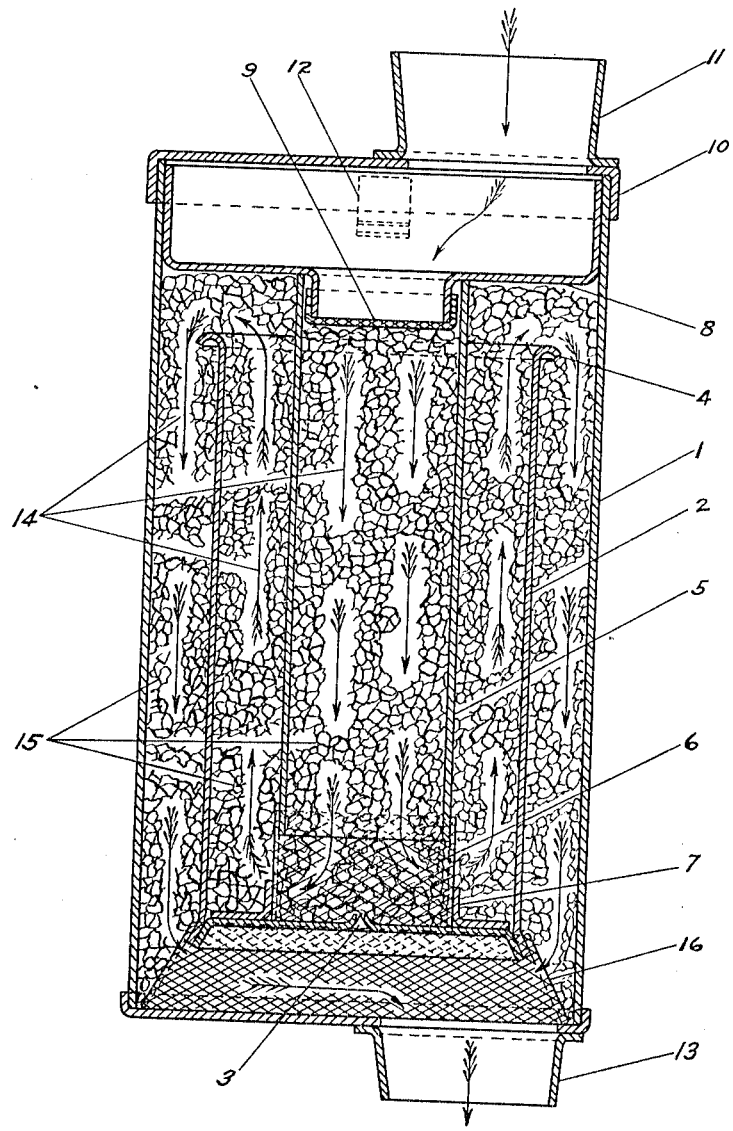
WITNESSES:
Claude R. Allen
J. J. Putnam
INVENTOR
Merton L. Crandall

UNITED STATES PATENT OFFICE.

MERTON L. CRANDALL, OF PONTIAC, MICHIGAN.

WATER FILTERER OR STRAINER.

1,090,283.  Specification of Letters Patent.  Patented Mar. 17, 1914.

Application filed December 26, 1912. Serial No. 738,721.

*To all whom it may concern:*

Be it known that I, MERTON LESTER CRANDALL, a citizen of the United States of America, residing at Pontiac, in the county of Oakland and State of Michigan, have invented certain new and useful Improvements in Water Filterers or Strainers, of which the following is a specification, reference being had therein to the accompanying drawings.

This invention relates to a water filter that is particularly adapted for purifying rain water or other water introduced as from a pail, spout or the like and not under head as in the case of a faucet filter which is adaptable only for a water system under pressure.

The invention includes means whereby the slight head attained in the filter itself is used to propel the water easily and gently through beds of charcoal in such manner as not to disturb the charcoal and as to insure a complete arresting of any extraneous matters.

The invention also includes means whereby the filter bed may be readily replaced and the parts of the filter cleaned.

The invention consists in the matters hereinafter set forth and particularly pointed out in the appended claims.

The drawing is a view in sectional elevation of a filter that embodies features of the invention.

Referring to the drawing, an outer casing 1 is provided at its open upper end with a cover that closes over it with a depending flange 10 and has an intake connection 11 for receiving the contents of a pail or for direct communication with the end of a rain spout or the like. A pair of oppositely disposed latches 12 of any preferred type are used to hold the cap or cover in place. A catch basin and strainer 8 is inset in the upper portion of the casing 1 and has a depending smaller outlet in which is a screen 9. This outlet discharges into the upper end of a cylinder 5 whose upper end is otherwise closed by the catch basin 8. The lower end portion of the cylinder has discharge openings formed by a screen and rests on and is held concentric by three feet 7.

3 is a drain hole in the bottom of the tank 2.

The tank 2 encircles the cylinder 5 and rests on a conoidal screen base 16. The upper margin of the tank 2 does not extend to the catch basin 8 but is outrolled to divert water flowing thereover from trickling down the outer face of the tank wall. The cylinder 5 and the two annular spaces formed by the tank 2 and casing around the cylinder are filled with charcoal or like filtering material.

In operation, any water that is introduced into the catch basin settles through the cylinder and rises therein until it overflows the outrolled margin of tank 2. Thence it passes downwardly through the bed of filtering material to the screen 16 from whence it passes outwardly through the casing. The latter is provided with any suitable discharge spout such as that indicated at 13. In no instance is there any head imposed upon the fluid passing through the filter bed other than that due to the difference in level between the margin of tank 2 and that of the liquid in the catch basin so that the filtering material is not washed away by the operation of the water.

The filter may be readily taken down to replace the filtering material and may be readily cleansed and sterilized.

Obviously, changes may be made in the details of construction without departing from the spirit of the invention and I do not care to limit myself to any particular form or arrangement of parts except as set forth in the appended claims.

I claim as my invention:—

1. A water filter comprising an outer casing, a conoidal screen in the base thereof over an outlet therethrough, a cylinder resting on the screen and having screened outlets near its base, a catch basin detachably secured in the casing with a screened outlet discharging into the upper portion of the cylinder which it otherwise closes, a cap for the casing having an inlet directing water into the catch basin, a tank resting on the screen concentrically with the cylinder and having an outrolled upper margin below the level of the catch basin and a filter bed filling the casing.

2. A water filter comprising an outer casing having an outlet through its base, a raised screen over the opening, an inner cylinder supported by the screen and provided with screened lateral outlets near its base, a catch basin closing the upper end of the casing and cylinder, and having a screened outlet discharging into the cylinder, a cap for the catch basin having a water inlet, a tank resting on the screen concentrically with the cylinder and the casing and having an outrolled upper margin below the level of the inlet to the cylinder and granular filtering material packed in the tank, cylinder and casing.

3. In a water filter, an outer casing having an open upper end and a closed base with an outlet therethrough, a screen in the base over the outlet having a raised middle portion, a cylinder supported by the screen and provided with lateral outlets near its base, a catch basin telescoping into the upper portion of the casing and resting on the upper margin of the cylinder, arranged to discharge into the latter, a tank resting on the screen concentrically with the cylinder and casing, an outrolled rim flange on the upper end of the tank below the level of the catch basin and filtering material filling the casing, cylinder and tank.

In testimony that I claim the foregoing as my invention, I have hereunto signed my name this 21st day of December A. D. 1912.

MERTON L. CRANDALL.

Witnesses:
CLAUDE R. ALLEN,
J. A. PUTNAM.

Copies of this patent may be obtained for five cents each, by addressing the "Commissioner of Patents, Washington, D. C."